United States Patent [19]

Hart et al.

[11] Patent Number: 4,539,685
[45] Date of Patent: Sep. 3, 1985

[54] PASSIVELY Q-SWITCHED LASER HAVING A VARIABLE PULSE RATE

[75] Inventors: Richard A. Hart, Wethersfield; Charles Bartkowski, Amston, both of Conn.

[73] Assignee: United Technologies Corporation, Hartford, Conn.

[21] Appl. No.: 414,097

[22] Filed: Sep. 2, 1982

[51] Int. Cl.³ .............................. H01S 3/09; H01S 3/10
[52] U.S. Cl. ........................................ 372/25; 372/11; 372/82
[58] Field of Search .................. 372/25, 30, 9, 10, 11, 372/81, 82; 250/205; 356/5

[56] References Cited

U.S. PATENT DOCUMENTS

| 3,333,101 | 7/1967 | Bell | 372/82 |
| 3,517,328 | 6/1970 | Dryden | 372/82 |
| 3,586,998 | 6/1971 | Gould | 372/11 |
| 3,641,459 | 2/1972 | Paoli et al. | 372/30 |
| 4,240,746 | 12/1980 | Courtenay et al. | 372/29 |
| 4,363,126 | 12/1982 | Chenausky et al. | 372/82 |

FOREIGN PATENT DOCUMENTS

WO81/00330  2/1981  PCT Int'l Appl. ................... 372/64

OTHER PUBLICATIONS

Berdahl, "Short-Range Self-Pulsed Optical Radar", NASA Tech. Briefs, vol. 5, No. 4, Winter 1980, p. 433.

Primary Examiner—James W. Davie
Attorney, Agent, or Firm—Eric W. Petraske

[57] ABSTRACT

A passively Q-switched RF powered laser provides a variable output pulse format by controlling the duration of applied RF power and the time interval between application of power. High repetition rates may be used for scanning and target acquisition in a laser radar system and low repetition rates may be used for ranging.

3 Claims, 4 Drawing Figures

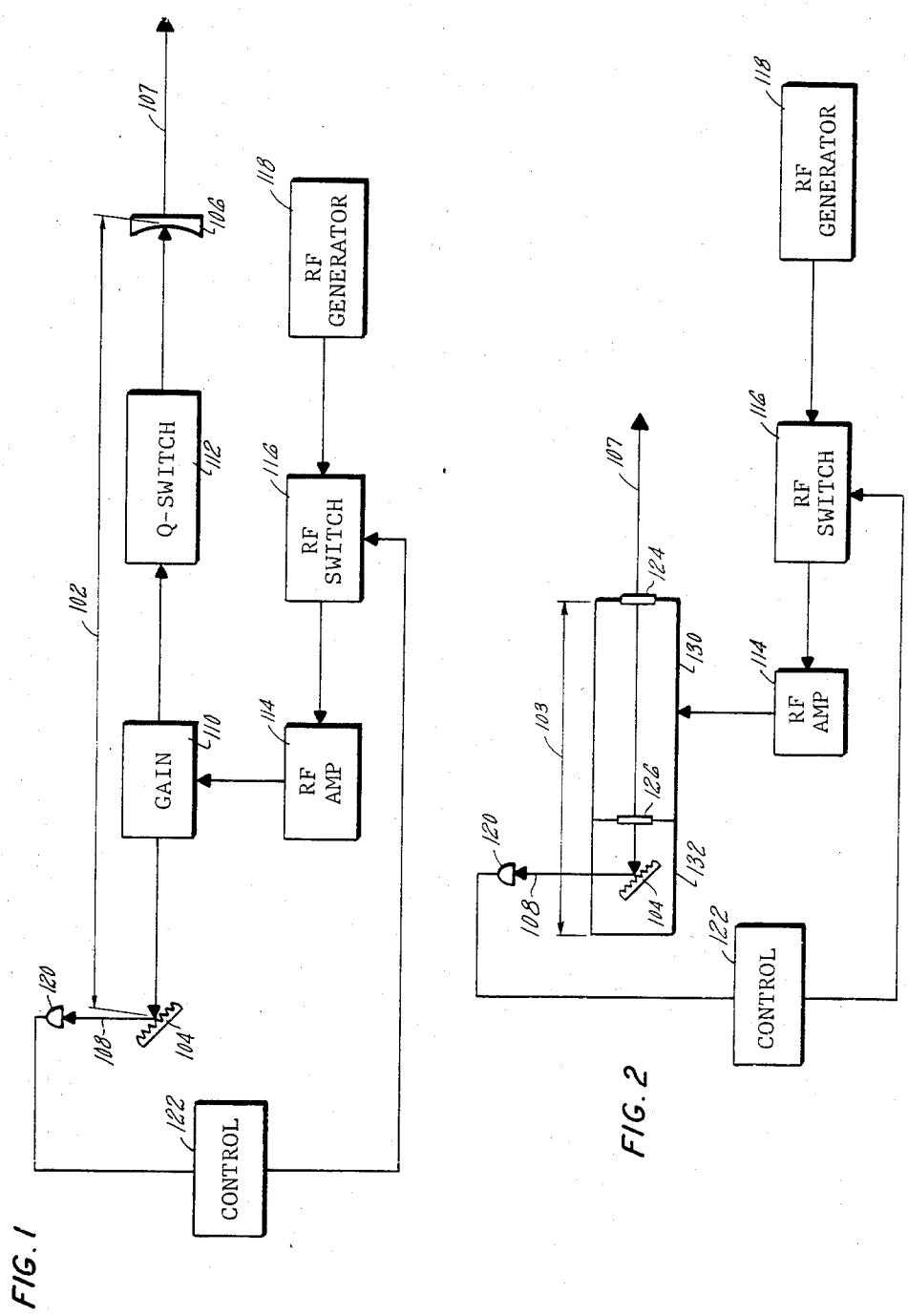

100 KHz PRF
FWHM = 180nS

4KHz PRF
FWHM = 90nS

PASSIVELY Q-SWITCHED LASER HAVING A VARIABLE PULSE RATE

The Government has rights in this invention pursuant to Contract No. DAAK80-79-C-0302 awarded by the Department of the Army.

1. Technical Field

The field of the invention is that of a Q-switched laser having a variable repetition rate.

2. Background Art

It is known to construct a passively Q-switched laser using $SF_6$ or another saturable absorber, and that such a laser produces a train of optical pulses having a repetition rate that depends on the gain of the laser medium and hence on the optical cavity length. The dependence of repetition rate on cavity length in prior art passively Q-switched lasers has made the repetition rate both unstable and difficult to change, especially at low repetition rates. Actively Q-switched lasers using electro-optical modulators are known and are able to change the repetition rate quickly to accommodate differing system requirements, but the use of the electro-optical modulator requires additional expense, additional system complexity and additional power consumption.

U.S. Pat. No. 3,641,459 discloses stabilization of the repetition rate of a diode laser by feeding back a signal on a CW basis that is harmonically related to the repetition rate. This patent does not disclose variation of the repetition rate that is stabilized by this method.

DISCLOSURE OF THE INVENTION

The invention relates to a passively Q-switched laser in which the repetition rate is made variable by detecting the output of the laser beam and controlling an RF amplifier supplying power to the gain medium in accordance with the desired repetition rate.

One feature of the invention is the ability to provide pulses at a low repetition rate in a stable manner. Another feature of the invention is the ability to modify quickly the pulse format of the system.

BRIEF DESCRIPTION OF THE DRAWINGS

FIG. 1 illustrates in schematic form an embodiment of the invention having a single optical cavity;

FIG. 2 illustrates schematically an embodiment of the invention in which the laser has a pair of coupled cavities and FIGS. 3A and 3B illustrates output pulses for different conditions.

BEST MODE FOR CARRYING OUT THE INVENTION

Figure 3A:
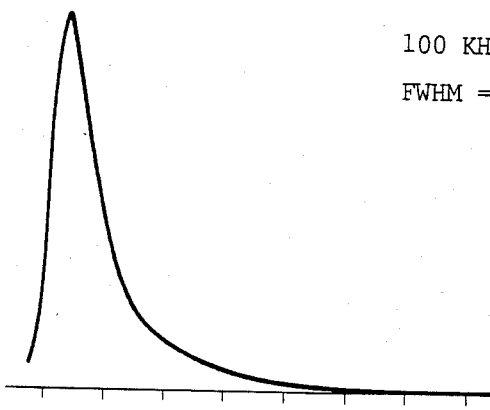

In FIG. 1, laser cavity 102, bounded by grating 104 and mirror 106, includes gain cell 110 and Q-switch cell 112. Mirror 106 is illustratively a 90% reflectivity mirror having a 40 centimeter radius of curvature. Grating 104 has typically a 96% reflectivity and is set to reflect the P20 line of $CO_2$. Q-switch 112 is a cell having a length of 20 centimeters and including less than 100 microns of $SF_6$ together with approximately 20 Torr of hydrogen used as a quenching medium. Gain medium 110 is illustratively an RF waveguide $CO_2$ laser such as that disclosed in U.S. Pat. No. 4,363,126 issued Dec. 7, 1982. Electrodes for gain medium 110 and windows for both the gain medium and the cell are omitted from the drawing. RF power is supplied to gain cell 110 through RF amplifier 114 illustratively being capable of supplying 400 watts of peak power with an average power of between 50 to 200 watts, depending upon the application of the system. RF power is generated by generator 118 at a typical frequency of approximately 200 megahertz and is switched by RF switch 116 which is controlled in response to signals from controller 122 which will be described below. Laser cavity 102 produces output beam 107, the main beam, and a sample beam 108 which is derived from specular reflection off grating 104. Detector 120 detects radiation traveling along beam 108 and sends a signal to controller 122.

In operation, laser radiation starts to build up within the $CO_2$ gain medium of cell 110 when RF power is applied, but is blocked from resonating within cavity 102 by Q-switch 112 which absorbs $CO_2$ radiation issuing from cell 110. When sufficient intensity has been built up in the system, Q-switch 112 bleaches, permitting the passage of radiation which resonates within cavity 102. A portion of the radiation emerges as beam 107 and a small sample is deflected from grating 104 towards detector 120. When detector 120 receives the radiation, it sends a signal to controller 122 which will respond in one of several ways. In one application, controller 122 opens switch 116 and holds it open for a predetermined period of time, for example 10 microseconds. After this 10 microsecond delay, switch 116 is closed and the process is repeated. This system results in a train of pulses, each pulse having a pulse width which is determined by the time required for the energy stored in gain cell 110 to be dissipated, so that the maximum pulse width will be a function of the degree of inversion which can be achieved within the $CO_2$ and also the amount of $CO_2$ which is present in cell 110. After the radiation is depleted, Q-switch 112 recovers, blocking further radiation until the threshold is again exceeded. The maximum repetition rate is thus dependent on the gain of cell 110. The frequency of the $CO_2$ radiation will be set by grating 104 and will be conveniently set at line center for maximum stability and maximum gain.

In the case of a ranging application for a laser radar system, a interpulse delay of 10 microseconds will limit the maximum range that can be detected without range ambiguity to 1.5 kilometers. If it is desired to range targets that are further apart, then controller 122 would increase the interpulse delay to an amount sufficient for the application. One advantageous feature of this invention is the great flexibility which is possible for the output pulse format. The interpulse spacing may be varied from the minimum which the system is capable of achieving, typically a 5 microsecond pulse spacing, or a 200 kilohertz repetition rate, to as low as a single pulse.

Controller 122 may be a microcomputer or an equivalent array of integrated circuits. In a very simple application that requires only a single pulse repetition rate, controller 122 could be simply a timer that opens switch 116 for a fixed period after every laser pulse. In more complex systems, controller 122 would include start and stop controls, a variable delay for quickly changing the repetition rate and circuits responsive to external signals, such as a target detection signal, for switching from one format to another.

In the prior art, it was not possible to vary the repetition rate of a passively Q-switched laser conveniently and quickly. If a laser were used in a laser radar system set up for a scanning mode having a relatively fast repetition rate of 100 kilohertz, it would not be possible to convert quickly to a ranging mode in which it is desired to measure precisely the distance from the laser to a target and in which the repetition rate would be about 10 kilohertz. Controller 122 in the present invention can readily be set to perform a scanning pattern at a rate of 100 kilohertz and then switch to a slow rate to provide ranging for targets which have been detected in the scanning mode.

Additionally, it is possible to use controller 122 to multiple-pulse the laser by keeping switch 116 closed to permit two or more pulses to emit at the minimum interpulse time determined by the Q-switch cell. This mode is advantageous in improving the precision of ranging by putting as many photons as possible onto the target in a series of closely spaced pulses.

In FIG. 2, an alternate embodiment of the invention is illustrated in which the RF generator, RF switch, amplified and control systems are the same but the laser cavity is modified. In the system in FIG. 1, the total laser cavity has a length of approximately 40 centimeters, which may be a disadvantage for some airborne applications. The system of FIG. 2 employs a pair of coupled cavities applying the principles of copending U.S. application Ser. No. 369,298, assigned to the assignee hereof, to produce a compact, rugged device. Optical cavity 103 is bounded by grating 104 and end window 124 of the gain medium. The Q-switching cell 132 and gain cell 130 now share a common window 126 having a reflectivity of approximately 75 to 85%.

The Q-switching cell now has a total length of approximately 1½ inches, considerably shorter than the embodiment of FIG. 1. Further, the lengths of the two cavities wnich are coupled together, one being the gain cell and the other being the $SF_6$ cell, are adjusted to produce a total reflectivity of the cavity which is in a insensitive position region as disclosed in copending U.S. application Ser. No. 369,298, assigned to the assignee hereof. This system is very insensitive to vibrational and thermal misalignment and is therefore well suited for airborne laser radar applications. Further stability may be provided by standard techniques of thermal compensation and/or active control cavity length, if a particular application requires it. Gain cell 130 is illustratively a 2 mm square RF waveguide containing a gas mixture of 65 Torr of He, 20 Torr of $CO_2$, 10 Torr of $N_2$ and 5 Torr of Xe and having a length of between 10 to 60 centimeters depending upon the power output desired. It may be constructed preferably according to the principles of U.S. Pat. No. 4,363,126 issued Dec. 7, 1982 which produces a simple, compact and rugged laser.

Figure 3B:
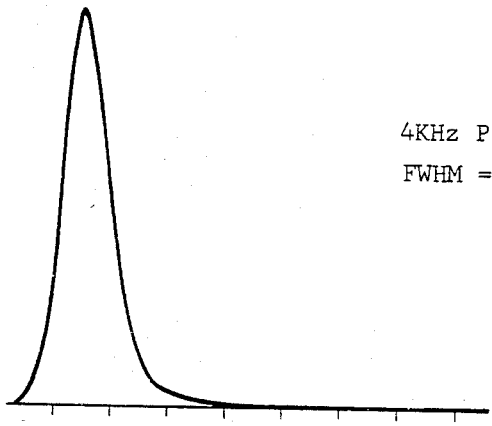

FIGS. 3A and 3B ilustrates typical pulses produced under different conditions showing the suitability of different repetition rates to different applications. FIG. 3A shows (on a scale of 100 nS per division) a pulse produced at a 100 KHz pulse repetition rate having pulse energy of approximately 40 μJ per pulse with a pulse having a full width half max (FWHM) of 180 nanoseconds and a rather long tail so that the difference from base line to reture to the base line is approximately 2.6 microseconds. This pulse is suitable and this repetition rate is suitable for a scanning application requiring a great number of relatively low powered pulses to scan a field of vision to identify targets. In contrast, the pulse in FIG. 3B (shown on a scale of 200 nS per division), produced at a 4 KHz pulse repetition rate, contains much greater energy of 125 μJ per pulse and is much narrower, having an FWHM of 90 nanoseconds and a much smaller tail having a zero to zero distance of 500 nanoseconds. This pulse is much better suited to a ranging application in which the great time between pulses will eliminate range ambiguity and the greater energy in the pulse will produce a better return signal.

By means of the subject invention, a passively Q-switched laser can quickly be switched from the pulse of FIG. 3a to the pulse of FIG. 3b and back again as the system demands require. Such flexibility was previously obtainable only by using an electro-optical modulator to control the pulse repetition rate of an actively Q-switched laser and by paying the penalty in weight, power consumption and price.

We claim:

1. A passively Q-switched laser system having an optical cavity for resonating laser radiation, including an optical gain medium comprising:

RF means for applying RF power to said gain medium;

Q-switch absorbing means disposed within said optical cavity; and means for coupling radiation out of said cavity, characterized in that:

said laser system includes a detector responsive to laser radiation resonated within said cavity for generating a signal;

controller means responsive to said signal for controllig said RF means for applying RF power to turn off said RF means for a predetermined off period commencing after a predetermined delay from said signal.

2. A laser according to claim 1, further characterized in that said controller includes means for turnig off said RF means for one of a plurality of predetermined off periods, in accordance with a selection signal applied to said controller, whereby said output radiation will emerge from said laser with a variable pulse format dependent on said selection signal.

3. A laser according to claim 2, further characterized in that said predetermined delay permits at least two radiation pulses to emerge from said laser.

* * * * *